United States Patent
Nakayama et al.

(10) Patent No.: US 11,092,615 B1
(45) Date of Patent: Aug. 17, 2021

(54) ACCELERATION-DETERMINATION DEVICE AND METHOD

(71) Applicant: IHI CORPORATION, Tokyo (JP)

(72) Inventors: Takayuki Nakayama, Tokyo (JP); Yuji Kurata, Tokyo (JP); Takuya Sunakawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/271,668

(22) PCT Filed: Aug. 2, 2019

(86) PCT No.: PCT/JP2019/030471
§ 371 (c)(1),
(2) Date: Feb. 26, 2021

(87) PCT Pub. No.: WO2020/066297
PCT Pub. Date: Apr. 2, 2020

(30) Foreign Application Priority Data

Sep. 26, 2018 (JP) .............................. JP2018-180095

(51) Int. Cl.
| | |
|---|---|
| *G01P 15/00* | (2006.01) |
| *G01P 15/02* | (2013.01) |
| *B25J 13/08* | (2006.01) |
| *G01B 21/22* | (2006.01) |

(52) U.S. Cl.
CPC ............ *G01P 15/02* (2013.01); *B25J 13/088* (2013.01); *G01B 21/22* (2013.01)

(58) Field of Classification Search
CPC ......... G01P 15/02; G01B 21/22; B25J 13/088
USPC ................ 73/514.01; 702/141–142, 148
See application file for complete search history.

(56) References Cited

U.S. PATENT DOCUMENTS

| | | | |
|---|---|---|---|
| 7,699,299 B2* | 4/2010 | Yoshioka | H01J 9/266 269/50 |
| 2004/0140787 A1 | 7/2004 | Okamoto et al. | |
| 2008/0140257 A1 | 6/2008 | Sato et al. | |
| 2009/0212478 A1 | 8/2009 | Murayama | |
| 2011/0011173 A1 | 1/2011 | Zhang | |
| 2017/0170050 A1 | 6/2017 | Yoshida et al. | |

(Continued)

FOREIGN PATENT DOCUMENTS

| | | |
|---|---|---|
| CN | 1267252 C | 8/2006 |
| JP | 2001-004528 A | 1/2001 |
| JP | 2005-052919 A | 3/2005 |

(Continued)

*Primary Examiner* — Aditya S Bhat
(74) *Attorney, Agent, or Firm* — Rothwell, Figg, Ernst & Manbeck, P.C.

(57) ABSTRACT

An acceleration-determination device (D) includes a gripping jig (1) that retains a gripping tool (1g) gripping a test piece (Y) in a state where the gripping tool is tilted from a horizontal state, detects a tilt angle of the gripping tool, and makes it possible to change a gripping force of the gripping tool, a mass adjuster (B) that adjusts a mass of the test piece such that a component force of gravity in a tilt direction which varies according to the tilt angle equals gravity acting on the test piece before tilting thereof, and an acceleration calculator (3b) that calculates an acceleration of the test piece when the test piece is detached from the gripping tool based on the tilt angle and a gravitational acceleration acting on the test piece when the test piece is detached from the gripping tool.

5 Claims, 2 Drawing Sheets

(56) References Cited

U.S. PATENT DOCUMENTS

2019/0311079 A1   10/2019   Moriya et al.

FOREIGN PATENT DOCUMENTS

| JP | 2008-142810 A | 6/2008 |
| JP | 2009-202268 A | 9/2009 |
| JP | 2011-143496 A | 7/2011 |
| JP | 2016-174111 A | 9/2016 |
| JP | 2018-103339 A | 7/2018 |
| TW | 201722663 A | 7/2017 |
| WO | 2017/104648 A1 | 6/2017 |

* cited by examiner

ACCELERATION-DETERMINATION DEVICE AND METHOD

CROSS REFERENCE TO RELATED APPLICATION

This application is a 35 U.S.C. 371 National Phase Entry Application from PCT/JP2019/030471, filed Aug. 2, 2019, which claims priority to Japanese Patent Application No. 2018-180095, filed Sep. 26, 2018, the disclosures of which are incorporated herein in their entirety by reference, and priority is claimed to each of the foregoing.

TECHNICAL FIELD

The present disclosure relates to an acceleration-determination device and method.

Priority is claimed on Japanese Patent Application No. 2018-180095, filed Sep. 26, 2018, the content of which is incorporated herein by reference.

BACKGROUND ART

As an example of the related art, Patent Literature 1 discloses a tray transfer device that automatically exchanges a tray. This tray transfer device transfers a tray between a carry-in space, a carry-out space, and a processing space by gripping the tray using hands mounted at the tip end of a robot arm.

CITATION LIST

Patent Literature

[Patent Literature 1]
Japanese Unexamined Patent Application, First Publication No. 2011-143496

SUMMARY OF INVENTION

Technical Problem

As described in Patent Literature 1, a mechanical pinching device having two opening and closing claws, a suction pad, an electromagnetic pad, and the like is used as the hands. Among these hands, a suction hand is a gripping device that grips a transfer object by setting the internal pressure of a pad, which is in contact with the transfer object, to be in a negative-pressure state (a vacuum state) as is well known.

In a case where the transfer object is gripped with this suction pad, a transfer velocity and acceleration at which the gripped state of the transfer object can be maintained are optimally set, and the setting of the transfer velocity and acceleration is determined depending on an acceleration added to the transfer object in accordance with the weight of the transfer object by repeating a test of gripping and transferring the transfer object multiple times before the actual transfer task. Therefore, a task for setting the transfer velocity and acceleration in a case where the suction pad is used as a gripping device is a time-consuming task, and may impair the efficiency of the actual transport task in some cases.

The present disclosure was contrived in view of such circumstances, and an object thereof is to easily obtain the acceleration of a transfer object during its transfer.

Solution to Problem

In order to achieve the above object, according to a first aspect of the present disclosure, there is provided an acceleration-determination device including: a gripping jig that retains a gripping tool gripping a test piece in a state where the gripping tool is tilted from a horizontal state, detects a tilt angle of the gripping tool, and makes it possible to change a gripping force of the gripping tool; a mass adjuster that adjusts a mass of the test piece such that a component force of gravity in a tilt direction which varies according to the tilt angle equals gravity acting on the test piece before tilting thereof; and an acceleration calculator that calculates an acceleration of the test piece when the test piece is detached from the gripping tool based on the tilt angle and a gravitational acceleration acting on the test piece when the test piece is detached from the gripping tool.

According to a second aspect of the present disclosure, in the acceleration-determination device of the first aspect, the gripping jig includes: a support member having a predetermined length; and a rotating member whose lower end is attached with the gripping tool and whose upper end is rotatably engaged with the support member.

According to a third aspect of the present disclosure, in the acceleration-determination device of the first or second aspect, the acceleration calculator calculates the acceleration based on the following Expression (1) where $\theta$ represents the tilt angle, g represents the gravitational acceleration, and a represents the acceleration.

$$a = g \sin \theta \qquad (1)$$

According to a fourth aspect of the present disclosure, in the acceleration-determination device of any one of the first to third aspects, the gripping tool includes a suction hand.

According to a fifth aspect of the present disclosure, an acceleration-determination method is provided including: retaining a gripping tool gripping a test piece in a state where the gripping tool is tilted from a horizontal state and detecting a tilt angle of the gripping tool; adjusting a mass of the test piece such that a component force of gravity in a tilt direction which varies according to the tilt angle equals gravity acting on the test piece before tilting thereof, and calculating an acceleration of the test piece when the test piece is detached from the gripping tool based on the tilt angle and a gravitational acceleration acting on the test piece when the test piece is detached from the gripping tool.

Advantageous Effects of Invention

According to the present disclosure, it is possible to easily obtain an acceleration of a transfer object during its transfer using a test piece.

DESCRIPTION OF EMBODIMENTS

Hereinafter, an embodiment of the present disclosure will be described with reference to FIGS. 1, 2A, and 2B.

Figure 1:
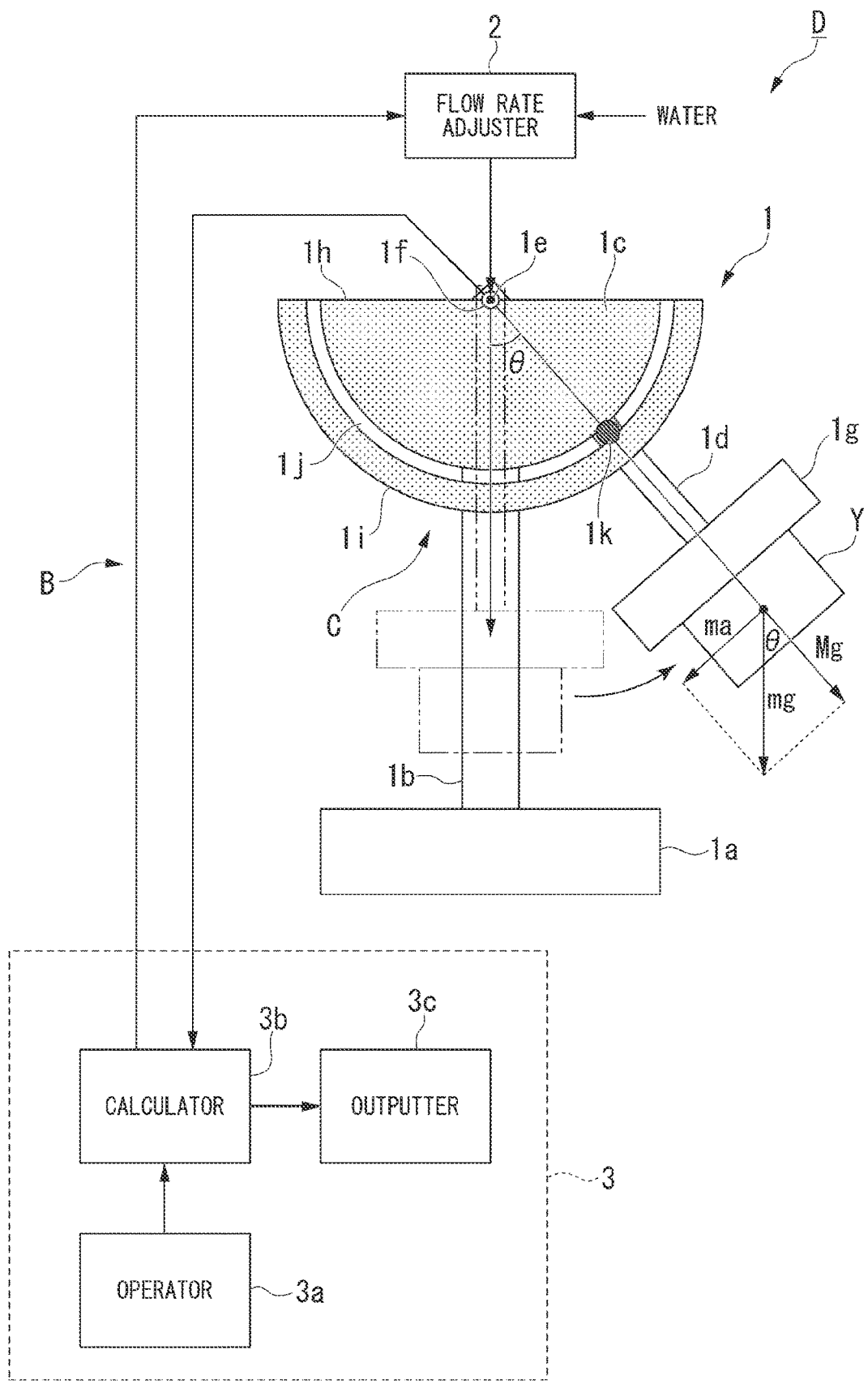
FIG. 1 is a schematic diagram illustrating a functional configuration of an acceleration-determination device according to an embodiment of the present disclosure.
Figure 2A:
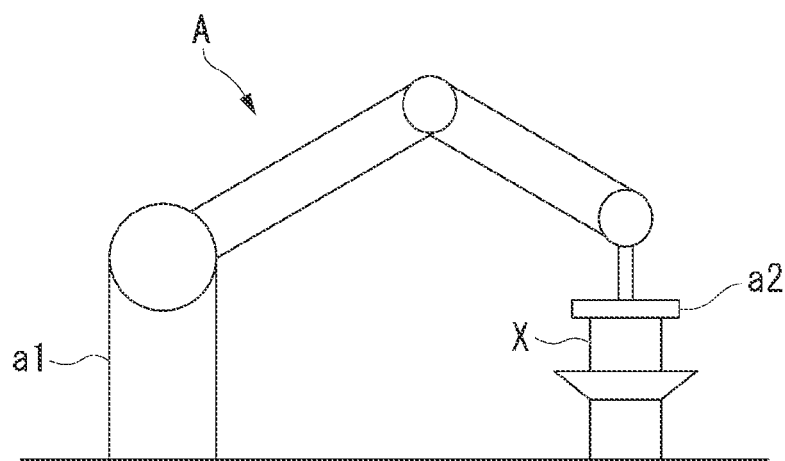
FIG. 2A is a schematic side view illustrating an outline of a transfer device in an embodiment of the present disclosure.
Figure 2B:
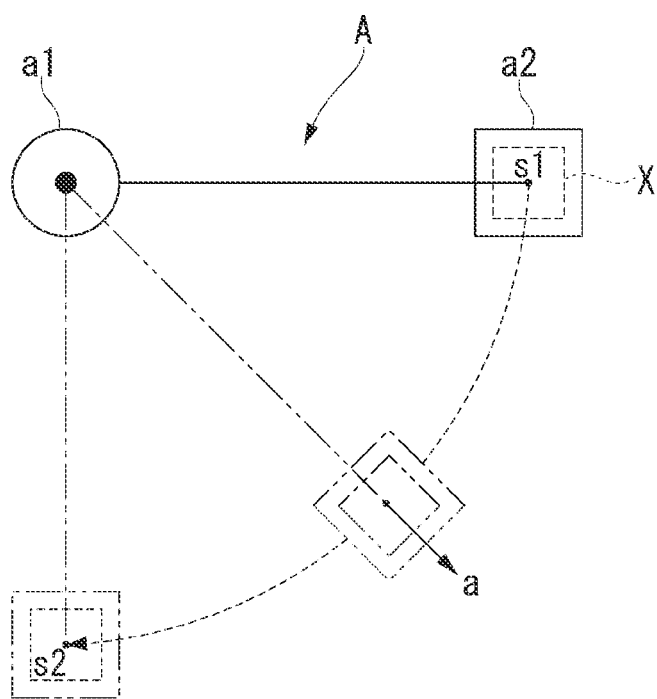
FIG. 2B is a schematic plan view illustrating an outline of the transfer device in an embodiment of the present disclosure.

An acceleration-determination device D according to the present embodiment is a device that includes a gripping jig 1, a flow rate adjuster 2, and a computer 3 as shown in FIG. 1, and acquires an acceleration a of a transfer object X when the transfer object X is transferred using a predetermined transfer device A as shown in FIGS. 2A and 2B.

First, the transfer device A will be described. The transfer device A is a robot arm (articulated robot) configured with one end (base end) fixed to a turning table a1 and a suction hand a2 mounted on the other end (tip end) as shown in FIG. 2A. The transfer device A transfers the transfer object X mounted on a mounting table located at a point s1 onto a mounting table located at a point s2. The suction hand a2 is a device having a plurality of suction pads (vacuum pads) arranged two-dimensionally to grip the transfer object X by the individual suction pads (vacuum pads) being suctioned onto the transfer object X.

The acceleration-determination device D is a device used in a preparation stage of transfer of the transfer object X using the transfer device A and is an auxiliary device for setting a maximum velocity and acceleration that can be added to the transfer object X in the suction hand a2. That is, as shown in FIG. 2B, the acceleration-determination device D is a device that turns the suction hand a2 gripping the transfer object X around the turning table a1 to thereby obtain the acceleration a of the transfer object X when the transfer object X is transported from the point s1 to the point s2 as an index for setting the degree of vacuum of the suction pads (vacuum pads).

The gripping jig 1 includes a base 1a, a support column 1b, a guide plate 1c, a rotary arm 1d, a rotating shaft 1e, an angle sensor 1f, a suction hand 1g (gripping tool), and a test piece Y used for simulating the transfer object X and capable of having its mass changed. Among these components, the base 1a, the support column 1b, the guide plate 1c, and the rotating shaft 1e constitute a support member C in the present disclosure. In addition, the rotary arm 1d is equivalent to a rotating member in the present disclosure.

In the gripping jig 1, the base 1a is a pedestal that retains the support column 1b in a posture shown in FIG. 1, that is, a vertical posture (a posture in which the longitudinal direction of the support column 1b is equivalent to a vertical direction), and has a predetermined weight and an installation area in order to stably retain the support column 1b in the vertical posture. The base 1a is, for example, a plate-like weight.

The support column 1b is a columnar member having a predetermined length which is disposed upright on such a base 1a. That is, the lower end of the support column 1b contacts and is fixed to the upper surface of the base 1a. The guide plate 1c is a semicircular plate-like member fixed to the upper end portion of such a support column 1b via the rotating shaft 1e. As shown in FIG. 1, the guide plate 1c is fixed to the support column 1b in a state where the posture of a straight-line portion 1h is a horizontal posture (the posture of the guide plate 1c in a state where the straight-line portion 1h extends in a horizontal direction) and in a vertical posture in which a circular-arc portion 1i having a semicircular shape is located immediately below the straight-line portion 1h. The circular-arc portion 1i is located at the outer circumferential edge of the guide plate 1c.

In addition, a slit 1j having a semicircular shape is formed at the guide plate 1c concentrically with the circular-arc portion 1i. The slit 1j is a through-hole having a semicircular shape which penetrates from one surface (front surface) of the guide plate 1c to the other surface (rear surface) of the guide plate 1c. As shown in FIG. 1, such a slit 1j is formed in a region substantially equivalent to or slightly narrower than the circular-arc portion 1i around the intermediate point of the straight-line portion 1h. The slit 1j of the present embodiment is disposed inside the circular-arc portion 1i in its radial direction. In addition, the inside portion and the outside portion (the circular-arc portion 1i) of the guide plate 1c in its radial direction with respect to the slit 1j are connected to each other by a connecting portion (not shown).

The rotary arm 1d is a rod-like member having a predetermined length which is provided rotatably around the rotating shaft 1e. That is, a through-hole through which the rotating shaft 1e is inserted is formed at one end of the rotary arm 1d. The inside diameter of this through-hole is set to be slightly larger than the diameter of the rotating shaft 1e, and thus the through-hole is capable of sliding on the rotating shaft 1e. That is, the rotary arm 1d tilts (swings) in a predetermined angle range with respect to the support column 1b and the guide plate 1e which are included in a fixed system by the through-hole sliding on the rotating shaft 1e.

In addition, an engagement pin 1k is provided on a midway portion along the rotary arm 1d. The engagement pin 1k is a guide member which is engaged with the slit 1j of the guide plate 1e described above and guides the rotary arm 1d along the surface of the guide plate 1c and the slit 1j.

The rotating shaft 1e is a shaft member which is provided so as to extend between the upper portion of the support column 1b and the guide plate 1c. The rotating shaft 1e extends in a horizontal posture (extends in a horizontal direction) between the support column 1b and the guide plate 1e which both have vertical postures. That is, since the rotary arm 1d described above is supported by such a rotating shaft 1e, it rotates within a vertical plane (a plane parallel to the guide plate 1c).

The angle sensor 1f is a sensor that detects the rotation angle of the rotary arm 1d, that is, the tilt angle θ of the rotary arm 1d in a case where a state in which the rotary arm 1d is in a vertical posture is set as a reference angle. That is, the tilt angle θ is an angle between the vertical direction and the tilt direction of the rotary arm 1d (an angle between the vertical direction and the longitudinal direction of the arm 1d). The angle sensor 1f outputs a signal (an angle detection signal) indicating the tilt angle θ to the computer 3.

The suction hand 1g is a gripping tool which is provided at the other end of the rotary arm 1d different from the one end at which the through-hole is formed and has the same grip performance (suction performance) as the suction hand a2 of the transfer device A described above. That is, the suction hand 1g is a gripping tool having a plurality of suction pads (vacuum pads) arranged two-dimensionally to grip the test piece Y by the individual suction pads (vacuum pads) being suctioned onto the test piece Y.

In addition, the suction hand 1g includes a device that makes it possible to change the mass of the test piece Y in accordance with the tilt angle θ by injecting water into the test piece Y. This water is supplied from a flow rate adjuster 3, and is supplied to the test piece Y through the rotating shaft 1e and a flexible hose (not shown). The gripping jig 1 including such a suction hand 1g is a mechanical structure that retains the suction hand 1g (gripping tool) gripping the test piece Y in a state where the surface of the suction hand 1g, the surface gripping the test piece Y, is tilted in a predetermined angle range from a state (horizontal state) parallel to a horizontal plane and detects the tilt angle θ of the suction hand 1g. That is, the gripping jig 1 including the rotary arm 1d provided with the suction hand 1g retains the suction hand 1g in a state where the rotary arm 1d is tilted in a predetermined angle range from a vertical posture, and detects the tilt angle θ of the rotary arm 1d.

The flow rate adjuster 2 is a device that injects water into the test piece Y under control performed by the computer 3. That is, the flow rate adjuster 2 adjusts the flow rate of water supplied from the outside based on an injection control signal which is input from the computer 3, and supplies the water to the test piece Y through the rotating shaft 1e and the flexible hose. Such a flow rate adjuster 2 and the computer 3 constitute a mass adjuster B that adjusts the mass m of the test piece Y. The substance to be injected into the test piece Y may be a fluid other than water or a particulate matter such as sand.

The computer 3 includes an operator 3a, a calculator 3b, and an outputter 3c. The operator 3a is a functional member that accepts a worker's instruction and is a pointing device such as a keyboard, a mouse, or the like. The operator 3a outputs an operation signal to the calculator 3b.

The calculator 3b generates an injection control signal based on an angle detection signal which is input from the angle sensor 1f, that is, based on the tilt angle θ. That is, the calculator 3b constitutes the mass adjuster B together with the flow rate adjuster 2 described above. Although this will be described in detail later, the calculator 3b adjusts the mass m of the test piece Y by controlling the flow rate adjuster 2 in accordance with the tilt angle θ.

In addition, the calculator 3b is an acceleration calculator that calculates the acceleration a of the test piece Y by performing information processing on the operation signal and the angle detection signal based on a predetermined acceleration calculation program. That is, the calculator 3b calculates the acceleration a of the test piece Y when the test piece Y is detached from the suction hand 1g (gripping tool) based on the tilt angle θ and a gravitational acceleration g acting on the test piece Y when the test piece Y is detached from the suction hand 1g (gripping tool).

The calculator 3b includes a central processing unit (CPU) that performs calculating processing, a non-volatile memory that stores the acceleration calculation program and the value of the gravitational acceleration g, a volatile memory that temporarily stores intermediate calculation results obtained in a process of calculating the acceleration a, an interface circuit that sends and receives a signal to and from the operator 3a and the outputter 3c, or the like, and outputs the acceleration a which is a calculation result to the outputter 3c.

The outputter 3c outputs the acceleration a, which is input from the calculator 3b, to the outside in the predetermined output form. The outputter 3c is a display device that displays the acceleration a as an image, a printing device that prints the acceleration a, a storage device that stores the acceleration a as data, a communication device that transmits data of the acceleration a, or/and the like.

Although an operation of the acceleration-determination device D according to the present embodiment, that is, an acceleration-determination method, will be described in detail next, an operation of transfer of the transfer object X which is performed by the transfer device A will first be supplementarily described.

In a case where the transfer object X is transferred from the point s1 to the point s2, the transfer device A suctions and grips the transfer object X with the suction hand a2 by bringing the suction hand a2 closer to and into contact with the transfer object X on the mounting table from above and further performing vacuum suction on the suction pads (vacuum pads) arranged on the suction hand a2. When the suction hand a2 and the transfer object X are pulled up a predetermined distance in a vertical direction by the transfer device A, the transfer device A brings the turning table a1 into operation to turn the suction hand a2 and the transfer object X in a horizontal direction by a predetermined turning angle around a turning shaft.

In the turning operation of the turning table a1, the transfer object X is transported from the point s1 to the point s2 by turning the suction hand a2 and the transfer object X with a predetermined velocity profile. That is, when the suction hand a2 accelerates from an initial velocity (velocity=0) at the point s1 and reaches a predetermined velocity, the suction hand moves by a predetermined turning angle at the predetermined velocity and then decelerates to reach a final velocity (velocity=0) at the point s2.

In such a turning operation, a centrifugal force according to a turning velocity, that is, a velocity in a traveling direction acts on the transfer object X. This centrifugal force depends on the weight M of the transfer object X, but is a main cause for the transfer object X detached from the suction hand a2 during its transfer.

The acceleration-determination device D according to the present embodiment calculates the acceleration a which is a substantial cause for a centrifugal force acting on the transfer object X during such transfer of the transfer object X based on the gravitational acceleration g acting on the test piece Y and the tilt angle θ. That is, a worker causes the test piece Y to be suctioned and gripped by the suction hand 1g with a predetermined suction power P (suction pressure) in a state where the rotary arm 1d of the gripping jig 1 is in a vertical posture.

The worker gradually tilts the rotary arm 1d in a plane parallel to the guide plate 1e from a vertical posture in this gripped state. As a result, a component force Mg of gravity mg in an opposite direction of the test piece Y and the suction hand 1g, that is, the tilt direction of the rotary arm 1d, gradually decreases in accordance with an increase in the tilt angle θ. The calculator 3b adjusts the mass m of the test piece such that the component force Mg equals gravity acting on the test piece before tilting by controlling the flow rate adjuster 2, that is, equals the actual weight M of the transfer object X.

Expression (2) is derived as follows with reference to FIG. 1.

$$mg \sin θ = ma$$

$$a = g \sin θ$$

$$mg \cos θ = Mg \qquad (1)$$

Therefore, $$m = M/\cos θ \qquad (2)$$

The wording "adjust the mass m such that the component force equals the actual weight of the transfer object X" specifically means that the mass m increases as θ increases in Expression (2).

The derivation of Expression (1) is described in paragraph [0041].

Here, when the rotary arm 1d, that is, the suction hand 1g and the test piece Y, is tilted by the tilt angle θ within a vertical plane (a plane parallel to the guide plate 1c) in a state where the test piece Y is suctioned and gripped by the suction hand 1g, a component force ma of the gravity mg caused by the tilt angle θ acts on the test piece Y having the mass m as shown in FIG. 1. The component force ma is a force in a direction orthogonal to the tilt direction of the rotary arm 1d as shown in FIG. 1, and is a force equivalent to the centrifugal force acting on the transfer object X described above when the transfer object X is turned and transferred in a horizontal direction.

That is, the component force ma is a sinusoidal component of the gravity mg with respect to the tilt angle θ. The acceleration a that causes the component force ma is an acceleration equivalent to the centrifugal acceleration of the transfer object X described above when the transfer object X is turned and transferred in a horizontal direction, and is given by the following Expression (1).

$$a = g \sin \theta \quad (1)$$

A certain limit angle (tilt angle θ) with respect to the test piece Y is obtained by changing the tilt of the rotary arm $1d$ in such a state where the test piece Y is suctioned and gripped by the suction hand $1g$, that is, the tilt of the suction hand $1g$ and the test piece Y within a vertical plane (a plane parallel to the guide plate $1c$). This limit angle (tilt angle θ) is detected by the angle sensor $1f$ of the gripping jig 1 and is input to the computer 3 as an angle detection signal.

That is, the calculator $3b$ of the computer 3 gets the tilt angle θ when a worker operates the operator $3a$ as a limit angle, and calculates the acceleration a by substituting this limit angle (tilt angle θ) and the gravitational acceleration g into Expression (1). The outputter $3c$ of the computer 3 outputs the acceleration a which is input from the calculator $3b$ as an index of the transfer velocity and acceleration of the transfer device A during the transfer of the transfer object X.

For example, the calculator $3b$ stores a relational expression or a data table indicating a mutual relationship between the acceleration a and the mass m of the test piece Y in advance. By using the relational expression or the data table, the calculator $3b$ extracts the mass m in addition to the acceleration a and outputs the mass m and the acceleration a to the outputter $3c$. As a result, the outputter $3c$ outputs the acceleration a and the mass m to the outside.

According to the present embodiment, it is possible to easily obtain the acceleration a of the transfer object X during its transfer.

Meanwhile, the present disclosure is not limited to the above embodiment, and, for example, the following modification examples can be considered.

(1) A case where the suction hand $1g$ is used as a gripping tool has been described in the above embodiment, but the present disclosure is not limited thereto. That is, the present disclosure can be applied to various forms of gripping tools. For example, the present disclosure can also be applied to a gripping tool that suctions and grips the transfer object X using a magnetic force or a gripping tool that pinches the transfer object X with two claws.

(2) The gripping jig 1 shown in FIG. 1 is adopted in the above embodiment, but the present disclosure is not limited thereto. That is, since the guide plate $1c$ is formed in a semicircular shape, the gripping jig 1 can rotate the rotary arm $1d$ in both left and right directions, but, for example, a ¼ circular (fan-shaped) guide plate may be adopted instead of the semicircular shape, and the rotary arm $1d$ can be rotated only in one direction.

(3) A worker tilts the rotary arm $1d$ in the above embodiment, but the present disclosure is not limited thereto. For example, a driving device such as a motor that rotates the rotary arm $1d$ around the rotating shaft $1e$ may be provided.

(4) The acceleration of the test piece Y equivalent to the centrifugal acceleration of the transfer object X when the transfer object X is turned and transferred in a horizontal direction is obtained as the acceleration a in the above embodiment, but the present disclosure is not limited thereto. According to the present disclosure, it is possible to simulate not only the centrifugal acceleration of the transfer object X but also various accelerations.

(5) The calculator $3b$ constitutes the mass adjuster B together with the flow rate adjuster 2 and functions as an acceleration calculator in the above embodiment, but the present disclosure is not limited thereto. That is, the calculator that constitutes the mass adjuster B and the acceleration calculator that calculates the acceleration a of the test piece Y may be provided separately from each other.

INDUSTRIAL APPLICABILITY

The present disclosure can be used in an acceleration-determination device and method for determination an acceleration of a transfer object when the transfer object is transferred.

REFERENCE SIGNS LIST

D Acceleration-determination device
A Transfer device
B Mass adjuster
C Support member
X Transfer object
Y Test piece
a1 Turning table
a2 Suction hand
1 Gripping jig
$1a$ Base
$1b$ Support column
$1c$ Guide plate
$1d$ Rotary arm (rotating member)
$1e$ Rotating shaft
$1f$ Angle sensor
$1g$ Suction hand (gripping tool)
$1h$ Straight-line portion
$1i$ Circular-arc portion
$1j$ Slit
$1k$ Engagement pin
2 Flow rate adjuster
3 Computer
$3a$ Operator
$3b$ Calculator (acceleration calculator)
$3c$ Outputter

The invention claimed is:

1. An acceleration-determination device comprising:
a gripping jig that retains a gripping tool gripping a test piece in a state where the gripping tool is tilted from a horizontal state, detects a tilt angle of the gripping tool, and makes it possible to change a gripping force of the gripping tool;
a mass adjuster that adjusts a mass of the test piece such that a component force of gravity in a tilt direction which varies according to the tilt angle equals gravity acting on the test piece before tilting thereof; and
an acceleration calculator that calculates an acceleration of the test piece when the test piece is detached from the gripping tool based on the tilt angle and a gravitational acceleration acting on the test piece when the test piece is detached from the gripping tool.

2. The acceleration-determination device according to claim 1, wherein the gripping jig includes:
a support member having a predetermined length; and
a rotating member whose lower end is attached with the gripping tool and whose upper end is rotatably engaged with the support member.

3. The acceleration-determination device according to claim 1, wherein the acceleration calculator calculates the acceleration based on the following Expression (1) where $\theta$ represents the tilt angle, g represents the gravitational acceleration, and a represents the acceleration, $$a = g \sin \theta \tag{1}.$$

4. The acceleration-determination device according to claim 1, wherein the gripping tool includes a suction hand.

5. An acceleration-determination method comprising:
   retaining a gripping tool gripping a test piece in a state where the gripping tool is tilted from a horizontal state and detecting a tilt angle of the gripping tool;
   adjusting a mass of the test piece such that a component force of gravity in a tilt direction which varies according to the tilt angle equals gravity acting on the test piece before tilting thereof; and
   calculating an acceleration of the test piece when the test piece is detached from the gripping tool based on the tilt angle and a gravitational acceleration acting on the test piece when the test piece is detached from the gripping tool.

* * * * *